Jan. 27, 1970 P. SAWRENKO 3,491,819
VEGETABLE AND FRUIT PEELER
Filed Feb. 12, 1968

INVENTOR
*PETER SAWRENKO*
BY *Kent & Ade*
ATTORNEY

United States Patent Office 3,491,819
Patented Jan. 27, 1970

3,491,819
VEGETABLE AND FRUIT PEELER
Peter Sawrenko, Saskatoon, Saskatchewan, Canada
(307—6444 Silver Ave., Burnaby, British Columbia, Canada)
Continuation-in-part of application Ser. No. 539,796, Apr. 4, 1966. This application Feb. 12, 1968, Ser. No. 704,609
Int. Cl. A23h 7/00; A47j 17/14
U.S. Cl. 146—203
4 Claims

ABSTRACT OF THE DISCLOSURE

The device consists of a vegetable or fruit peeler driven by an electric motor or the like and having a shroud in which a cutter bar rotates having a plurality of flexible cutter elements thereon which conform with the contour of the vegetable or fruit being peeled and which also controls the depth of the cut due to the spacing of the cutter elements on the cutter bar.

My invention relates to new and useful improvements in vegetable and fruit peelers and this application is a continuation-in-part of my application Ser. No. 539,796 filed Apr. 4, 1966, now abandoned.

The principal essence and object of my invention is to provide a vegetable or fruit peeler of the character herewithin described adapted to be driven electrically and manipulated over the surface of the fruit or vegetable being peeled.

Another object of the invention is to provide a device of the character herewithin described in which the depth of cut is controlled.

A still further object of the invention is to provide a device of the character herewithin described which includes a novel peel discharge slot in the shroud.

A still further object of the invention is to provide a device of the character herewithin described in which the individual fingers adapt themselves to the contour of the fruit or vegetable being peeled, within limits.

Yet another object of the invention is to provide a device of the character herewithin described which is simple in construction, economical in manufacture, and otherwise well suited to the purpose for which it is designed.

With the foregoing in view, and all those objects, purposes or advantages which may become apparent from consideration of this disclosure and specifications, the present invention consists of the inventive concept embodied in the method, process, construction, arrangement of parts, or new use of the same, as herein particularly exemplified in one or more specific embodiments of such concept, reference being had to the accompanying figures in which.

In the drawings like characters of reference indicate corresponding parts in the different figures.

Proceeding therefore to describe the invention in detail, reference should be made to the accompanying drawings in which 10 illustrates a substantially cylindrical casing within which is situated an electric motor 11 driven either from rechargeable batteries or direct from the line current, as desired.

This motor includes a drive shaft 12 extending from one end thereof and a peeler or skin cutter collectively designated 13 is axially secured to the drive shaft 12 and extends therefrom.

Figure 1:
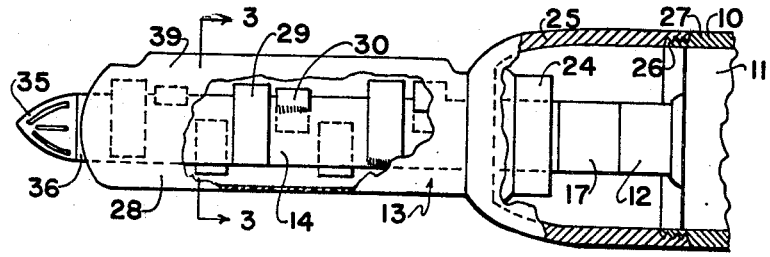
FIGURE 1 is a plan view of the device.
Figure 2:
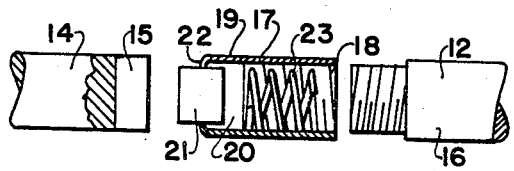
FIGURE 2 is an exploded side sectional view of the coupling between the drive shaft and the peeler shaft.
Figure 5:
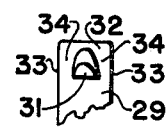
FIGURE 5 is a fragmentary plan view of one of the fingers.

FIGURE 2 shows details of the connection and it will be observed that the cutter shaft 14 is provided with a slot 15 within the end thereof.

The end 16 of the drive shaft 12 is shouldered and screw-threaded.

A sleeve coupling 17 consists of a hollow cylindrical end 18 internally screw-threaded and adapted to engage the screw threaded end 16 of the drive shaft 12.

The other portion 19 of the coupling sleeve 17 is of square cross section and contains a plunger 20 slidable lengthwise therein. The plunger includes a stem 21 extending through the apertured end 22 of the sleeve 17 and this stem is drivably engageable within the slot 15 of the cutter shaft 14.

A compression spring 23 normally urges the plunger 20 in the direction of the cutter shaft 14 thus giving a certain flexibility to the lengthwise movement of the plunger 20 which facilitates the engagement of the stem 21 within the slot 15 when the cutter assembly is secured to the casing 10.

The cutter assembly 13 is journalled by the shaft 14, within a bearing 24 carried within an end housing 25, which end housing 25 is screw-threadably securable to a screw-threaded shoulder 26 formed on the end 27 of the casing 10. When the portion 25 is screwed to the end 27, the slot 15 within the shaft gradually approaches the plunger 20 thus compressing the spring 23 until the plunger and slot are in alignment whereupon the spring engages the plunger with the slot and the portion 25 can then be tightened upon the end 27.

A substantially semi-cylindrical shield 28 is formed integrally with the portion 25 and extends therefrom and shrouds the major segment of the cutter assembly 13.

This cutter assembly 13 consists of the aforementioned shaft 14 together with a plurality of arcuately curved fingers 29 extending radially therefrom.

Figure 4:
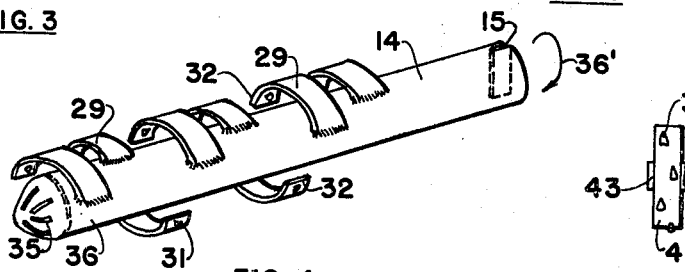
FIGURE 4 is an isometric view of the peeler shaft and fingers.

The inner ends 30 of the fingers or the bases of the fingers are located on the shaft 14 in spiral array as clearly illustrated in FIGURE 4 and it is desirable that the shaft and the fingers be made of plastic and it is essential that the fingers 29 be resilient.

The fingers are made from planar stock and a small cutter projection 31 is formed adjacent the distal ends 32 of the fingers and between the side edges 33 thereof.

These cutter projections, being situated between the side edges 33 and spaced therefrom, restrict the depth of cut as the portions 34 of the fingers upon each side of the cutter projections, bear the surface of the vegetable being peeled and the depth of cut is controlled by the size of the cutter projection 31.

A serrated pointed end 35 is formed upon the forward end 36 of the shaft 14 and may be used for removing blemishes from the surface of the vegetable. The cutter revolves in the direction of arrow 36' so that the fingers are in rotary trailing relationship with the shaft 14.

Figure 3:
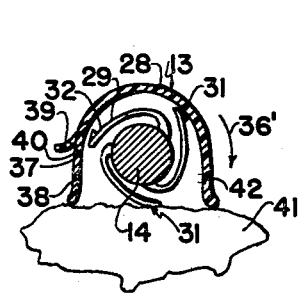
FIGURE 3 is a section along the line 3—3 of FIGURE 1, but enlarged with respect to FIGURE 1, and shown engaging the surface of a vegetable.

An elongated slot 37 is formed within the shield 28 adjacent one end 38 thereof and a flange 39 extends along the upper edge 40 of the slot as clearly shown in FIGURE 3.

In operation, the rotating cutter is placed against the surface of the vegetable 41, the edges 38 and 42 of the shield resting upon the surface thereof.

The distal ends 32 of the fingers project slightly below the plane of the edges 42 and 38 of the shield and engage the skin of the vegetable stripping skin from the vegetable.

The depth of cut is controlled by the depth of the cutting projections 31 as hereinbefore described.

The shredded skin is ejected through the slot 37 guided by the flange 39.

One important aspect of the flexible fingers 29 is that the centrifugal force generated by the rotation of shaft 14 will cause the fingers to extend radially outwardly until they engage the surface of the vegetable so that the fingers tend to adjust themselves to the contour of the vegetable.

This makes an extremely efficient cutter which produces the minimum of waste in the peeling operation.

Also, being made of a flexible plastic, the danger of injury to the operator is virtually eliminated.

Figure 6:
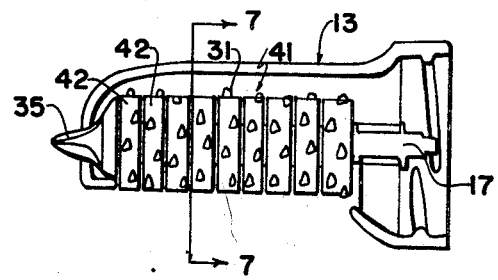
FIGURE 6 is a longitudinal sectional view of an alternative embodiment of my device.
Figure 8:
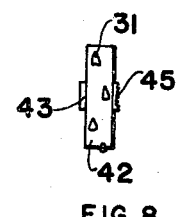
FIGURE 8 is a front elevation of one of the cutter elements per se.
Figure 7:
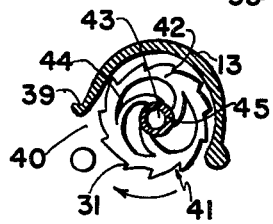
FIGURE 7 is a cross sectional view substantially along the line 7—7 of FIGURE 6.

FIGURES 6, 7 and 8 show an alternative arrangement in which the cutter elements 41 each consist of a cylindrical surface or drum 42 and a hub 43.

The cylindrical surface or drum 42 is relatively rigid and is mounted concentrically to the hub by means of a plurality of arcuately curved spokes 44 made of resilient material so that the cylindrical surface or drum will deflect easily relative to the spindle within limits.

A plurality of these elements is mounted on the shaft and held by the blemish remover 35 which is screw-threaded to the end of the shaft.

Rotation of the elements is assured by providing the ends 45 of the hubs with serrations which mesh with one another.

It will be noted that these ends protrude beyond the sides of the cylindrical surface or drum and maintain the elements in slightly spaced and parallel relationship with one another.

Cutter projections 31 extend from the surface of the drums or cylindrical surfaces and are staggered. However, the depth of cut is controlled as hereinbefore described in the previous embodiment.

Shredded skin is ejected through the slot 37 guided by the flange 39 and the periphery of the drums projects slightly below the plane of the edges 32 and 38 of the shield and engage the skin of the vegetable thus stripping the skin therefrom.

Since various modifications can be made to the invention as herein described within the scope of the inventive concept disclosed, it is not intended that protection of the said invention should be interpreted as restricted to the modification or modifications or known parts of such concept as have been particularly described, defined, or exemplified, since this disclosure is intended to explain the construction and operation of such concept, and not for the purpose of limiting protection to any specific embodiment or details thereof.

What I claim as my invention is:

1. A peeler for vegetables and fruits comprising in combination a source of electrical power, a casing holding said source of power, a shaft driven by said source of power and extending from one end of said casing, a rotary skin cutter detachably secured axially to said shaft, a semi-cylindrical shield secured to said casing and shrouding the major segment of said skin cutter, a skin discharge slot formed lengthwise in said shield, and a flanged guide extending from said shield along one edge of said slot, said rotary skin cutter including a cutter shaft, a plurality of cutter elements rotatable by said shaft, each of said elements including at least one cutter projection extending from the face of said element between the side edges thereof thereby controlling the depth of cut of said cutter elements.

2. The device according to claim 1 in which said cutter elements are arcuately curved, resilient and independently flexible fingers secured to and extending radially from said cutter shaft, the loci of the bases of said fingers joining said cutter shaft being in spiral array around said cutter shaft.

3. The device according to claim 2 in which each of said cutter elements includes a cylindrical drum and a hub, and a plurality of resilient arcuately curved spokes extending from said hub to said drum, and means on said hub to operatively engage adjacent hubs and maintain said drums in spaced and parallel relationship one with the other.

4. The device according to claim 3 in which said means on said hub includes serrated end surfaces on said hubs, said end surfaces extending beyond the width of said drum.

References Cited

UNITED STATES PATENTS

| | | | |
|---|---|---|---|
| 1,237,251 | 8/1917 | Lyng | 146—443 |
| 1,274,663 | 8/1918 | Auer | 146—203 |
| 1,746,813 | 2/1930 | Barry | 17—5 |
| 2,026,630 | 1/1936 | Harris | 20—1 |
| 3,026,612 | 3/1962 | Szczepanski | 30—123 |

W. GRAYDON ABERCROMBIE, Primary Examiner

U.S. Cl. X.R.

30—276; 146—43